United States Patent
Cantwell et al.

(10) Patent No.: US 7,433,973 B2
(45) Date of Patent: Oct. 7, 2008

(54) DISPLAY DEVICE FEATURING A REDUCED AMOUNT OF TIME FOR DETECTING VIDEO INPUT SIGNALS

(75) Inventors: Thomas Cantwell, Liberty Hill, TX (US); Joe E. Goodart, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 476 days.

(21) Appl. No.: 11/064,627

(22) Filed: Feb. 24, 2005

(65) Prior Publication Data
US 2006/0190633 A1 Aug. 24, 2006

(51) Int. Cl.
*G06F 3/00* (2006.01)
*G09G 5/00* (2006.01)
(52) U.S. Cl. .............................. 710/18; 710/15; 710/16; 710/17; 348/465; 348/553; 345/204
(58) Field of Classification Search ............ 710/15–18; 348/465, 553; 345/204
See application file for complete search history.

(56) References Cited

U.S. PATENT DOCUMENTS 6,678,005 B2 * 1/2004 Anderson et al. ........... 348/553
6,891,566 B2   5/2005 Marchese
7,071,993 B2 * 7/2006 Kim ........................... 348/465
7,180,511 B2 * 2/2007 Shigeta ....................... 345/204
2006/0088092 A1   4/2006 Chen et al.

FOREIGN PATENT DOCUMENTS

WO   WO 98/56177   12/1998

OTHER PUBLICATIONS

Search and Examination Report issued in corresponding Singapore Patent Application No. 200601084-7, Sep. 28, 2006.

* cited by examiner

*Primary Examiner*—Tammara R Peyton
(74) *Attorney, Agent, or Firm*—Haynes and Boone, LLP

(57) ABSTRACT

A display device includes a plurality of video input interfaces. The display device also includes a display controller coupled to the plurality of video input interfaces. The display controller determines a sequence in which the plurality of video input interfaces are scanned for a video signal. The display controller makes the determination in response to activity information associated with one or more video input interfaces included in the plurality of video input interfaces.

17 Claims, 4 Drawing Sheets

US 7,433,973 B2

DISPLAY DEVICE FEATURING A REDUCED AMOUNT OF TIME FOR DETECTING VIDEO INPUT SIGNALS

BACKGROUND

The description herein relates generally to information handling systems ("IHSs") and more particularly to display devices that are coupled to IHSs.

As the value and use of information continues to increase, individuals and businesses seek additional ways to process and store information. One option is an information handling system ("IHS"). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A display device (e.g., a projector, liquid crystal display device, cathode ray tube ("CRT") device, or a plasma display device) is capable of being coupled to a video source to display information (e.g., video signals) received from such video source. Examples of video sources include an IHS, cable television converter, video players (e.g., digital versatile disc players or video cassette recorder/players). In one example, a display device is capable of receiving video signals from more than one source. Such display device includes multiple video input interfaces (e.g., digital video interface ("DVI"), high definition multimedia interface ("HDMI"), component video interface, and a video graphics array ("VGA") interface).

A display device that includes multiple video input interfaces may cause various problems such as a delay, before displaying information, associated with the display device scanning for a video input signal.

What is needed is to provide for detecting a video signal in a reduced amount of time, without the disadvantages discussed above.

SUMMARY

Accordingly, a method and a display device for detecting a video signal in a reduced amount of time is provided. The method includes determining a sequence in which a plurality of video input interfaces are scanned for a video signal. The method provides for determining the sequence in response to activity information associated with one or more video input interfaces included in the plurality of video input interfaces.

DETAILED DESCRIPTION

For purposes of this disclosure, an information handling system ("IHS") may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit ("CPU") or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
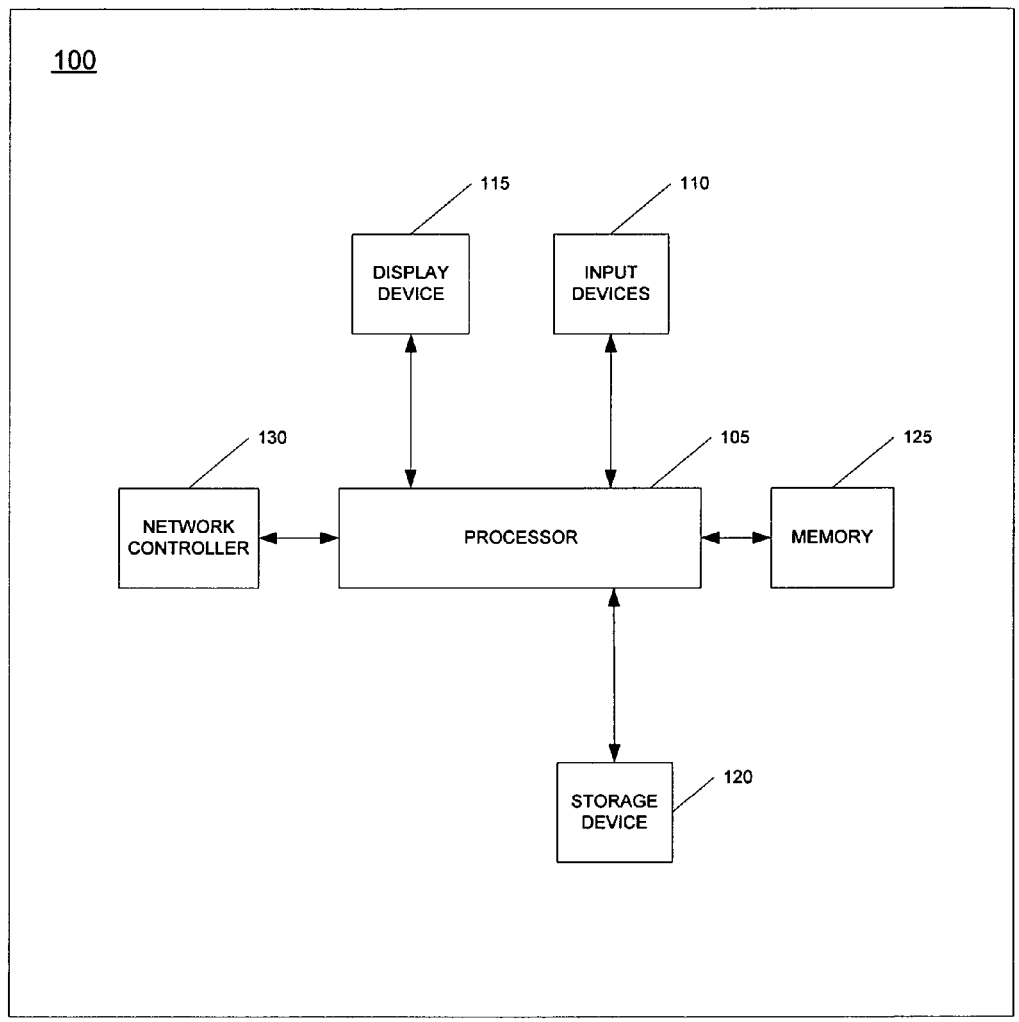
FIG. 1 is a block diagram of an information handling system according to an illustrative embodiment.

FIG. 1 is a block diagram of an IHS, indicated generally at 100, according to the illustrative embodiment. The IHS 100 includes a processor 105 (e.g., an Intel Pentium series processor) for executing and otherwise processing instructions, input devices 110 for receiving information from a human user, a display device 115 (e.g., a cathode ray tube ("CRT") device, a projector, a liquid crystal display ("LCD") device, or a plasma display device) for displaying information to the user, a storage device 120 (e.g., a non-volatile storage device such as a hard disk drive or other computer readable medium or apparatus) for storing information, a memory device 125 (e.g., random access memory ("RAM") device and read only memory ("ROM") device), also for storing information, and a network controller 130 for communicating between the IHS 100 and a network. Each of the input devices 110, the display device 115, the storage device 120, the memory device 125, and the network controller 130 is coupled to the processor 105, and to one another. In one example, the IHS 100 includes various other electronic circuitry for performing other operations of the IHS 100, such as a print device (e.g., a ink-jet printer or a laser printer) for printing visual images on paper.

The input devices 110 include, for example, a conventional keyboard and a pointing device (e.g., a "mouse", a roller ball, or a light pen). A user operates the keyboard to input alphanumeric text information to the processor 105, and the processor receives such information from the keyboard. A user also operates the pointing device to input cursor-control information to the processor 105, and the processor 105 receives such cursor-control information from the pointing device.

Figure 2:
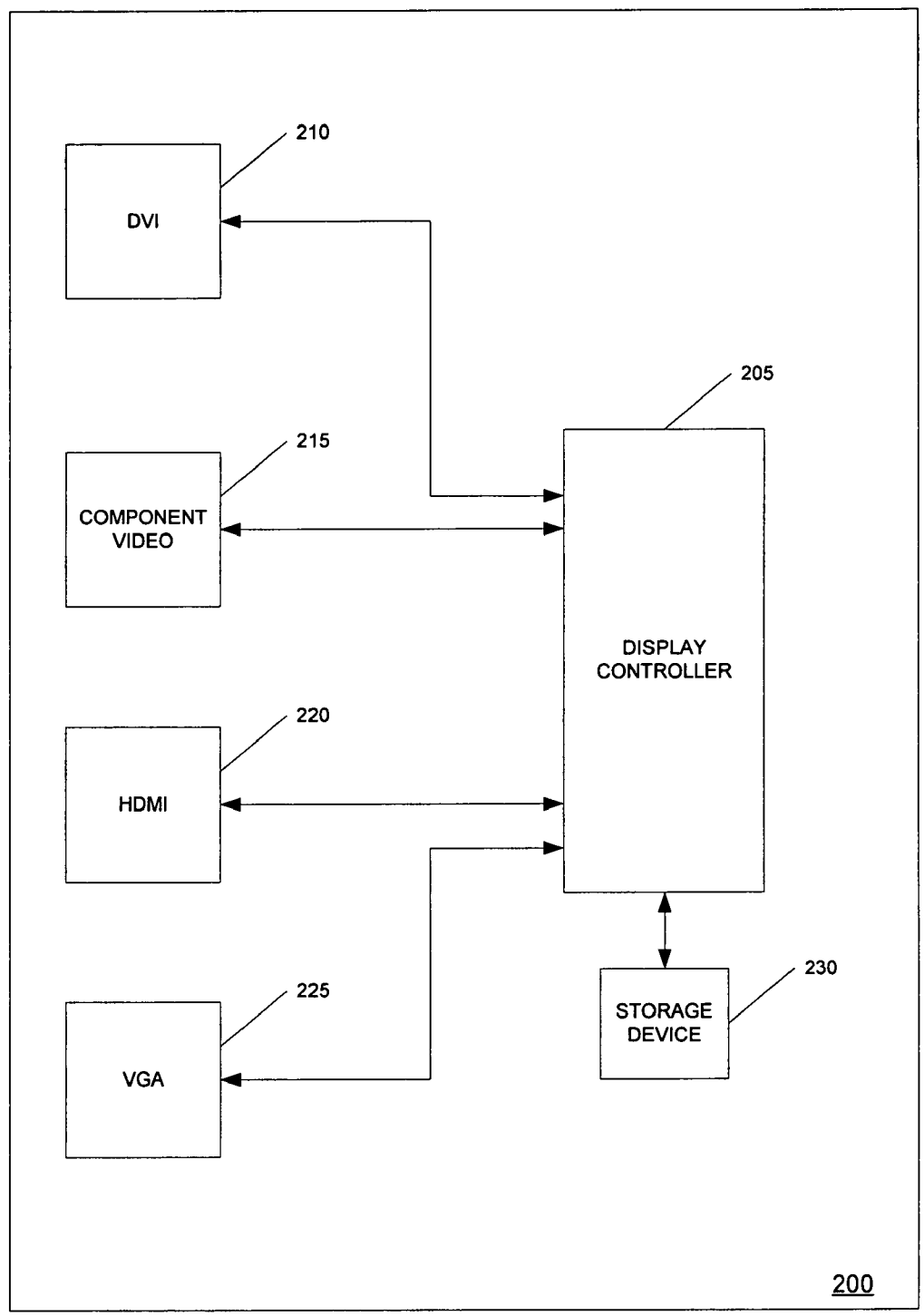
FIG. 2 is a block diagram of a display device that is representative of the display device of FIG. 1.

FIG. 2 is a block diagram of a display device, indicated generally at 200, that is representative of the display device 115 of FIG. 1. The display device 200 includes a display controller 205. The display device 200 also includes video input interfaces 210, 215, 220, and 225, each of which is coupled to the display controller 205. In the illustrative embodiment, each of the video input interfaces included by the display device 200, is of a different type from one another. For example, the input interfaces 210, 215, 220, and 225 are respectively, a digital video interface ("DVI"), a component video interface, a high definition multimedia interface ("HDMI"), and a video graphics array ("VGA") interface.

Via each of the interfaces 210, 215, 220, and 225, the display device 200 is capable of receiving video signals, and the display device 200 displays information (e.g., videos, images, and text) in response to such video signals.

The display device also includes a storage device 230 for storing information as discussed below (in connection with FIGS. 3 and 4). In one example, the storage device is a register.

When powering on or resuming from a reduced power state (i.e., a power save state), the display device 200 scans its video input interfaces for a video signal. In the illustrative embodiment, for reducing an amount of time for detecting a video signal, the display device 200 performs the operations discussed below in connection with FIG. 3.

Figure 3:
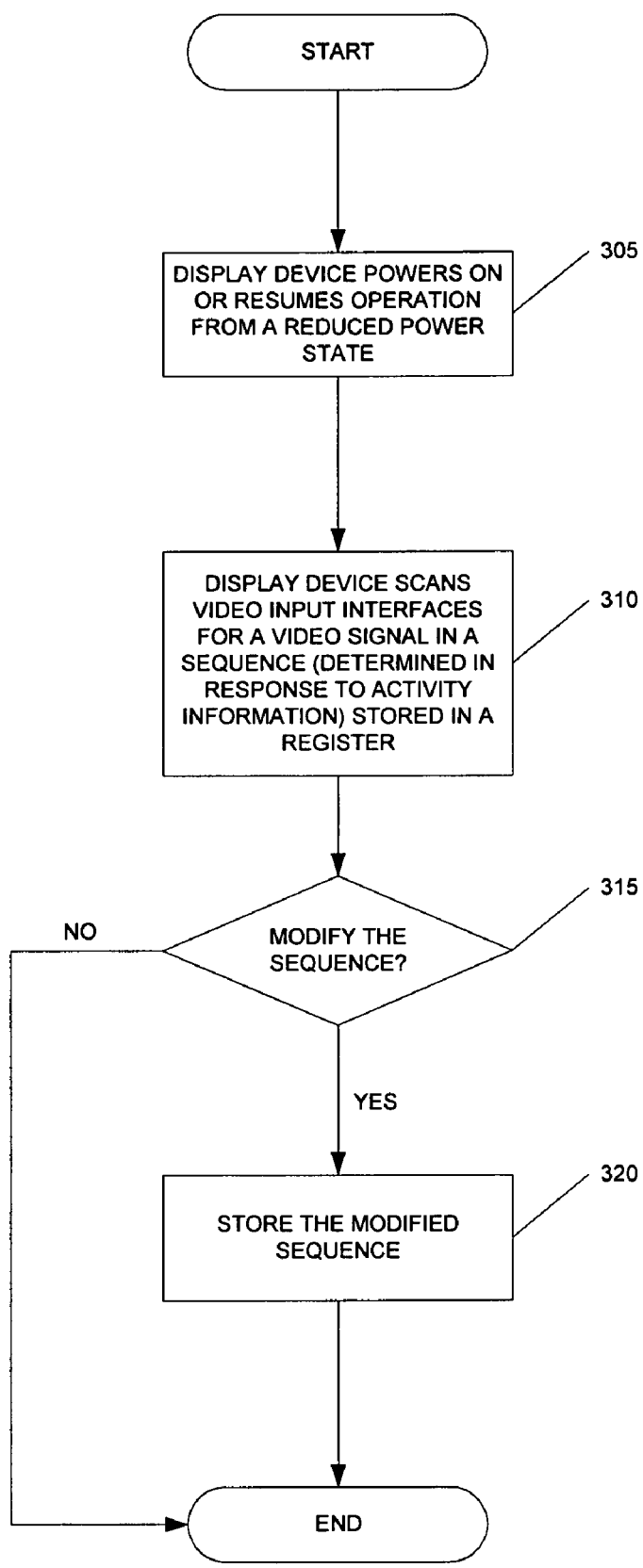
FIG. 3 is a flow chart of operations of a process performed by the display device of FIG. 2.

Accordingly, FIG. 3 is a flow chart of operations of a process performed by the display device 200 for detecting a video signal. In the illustrative embodiment, the display controller 205 executes such process.

The operation begins at a step 305, where the display device powers on or resumes its operation from a reduced power state. After the step 305, the operation continues to a step 310.

At the step 310, the display device scans the video input interfaces 210, 215, 220, and 225 in a sequence that was previously determined in response to activity information associated with one or more of such video input interfaces. The sequence is stored in the storage device 230. In one example, the activity information is also stored in the storage device 230.

In the illustrative embodiment, the activity information includes information indicating a likelihood that a specific video input interface included by the display device 200 is likely coupled a video source. In one example, in response to determining that a video input interface is the most recently active (i.e. the last video input interface used for receiving a video signal) video input interface, the display device 200 determines a sequence indicating that the video input interface is the first video input interface to be scanned. This is because the most recently active video interface is more likely coupled to a video source. The display device stores the most recently active video input interface, or a reference thereof, as the active (or "primary") video input interface in the storage device 230.

In another example, the activity information includes historical information associated with activity of one or more of the video input interfaces 210, 215, 220, and 225. In one version of such example, the historical information includes, for a predetermined number of the display device 200's on/off cycles, the number of times that each of the video input interfaces was the active video input interface.

For example, if the display device 200 determines that in the past 20 instances the display device 200 was powered on, the interfaces 210, 215, 220, and 225 were respectively active 4, 11, 3, and 2 times, the display device 200 determines that it will scan for a video signal in the following sequence: interfaces 215, 210, 220, and 225. Referring again to FIG. 3, after the step 310, the operation continues to a step 315.

At the step 315, the display device 200 determines whether to modify the sequence in which it scans the video input interfaces for a video signal. In one example, the display device determines a new sequence in response to activity information that is now modified in response to the operations performed at the step 310. For example, the display device 200 modifies the activity information after scanning the video input interfaces and determining the video input interface that is active (i.e. the video interface that is coupled to a video source). If the modified activity information indicates that scanning the video input interfaces in a new sequence will likely reduce the amount of time for detecting a video signal during the display device 200's subsequent power on or resume operation, the display device 200 determines that it will modify the sequence. Accordingly, the operation continues to a step 320. By comparison, if the display device determines not to modify the sequence, the operation ends.

At the step 320, the display device 200 determines the new sequence and stores the modified new sequence in the storage device 230. During a subsequent "power on" or resume operation, the display device 200 scans its video input interfaces in the modified sequence. After the step 230, the operation ends.

Figure 4:
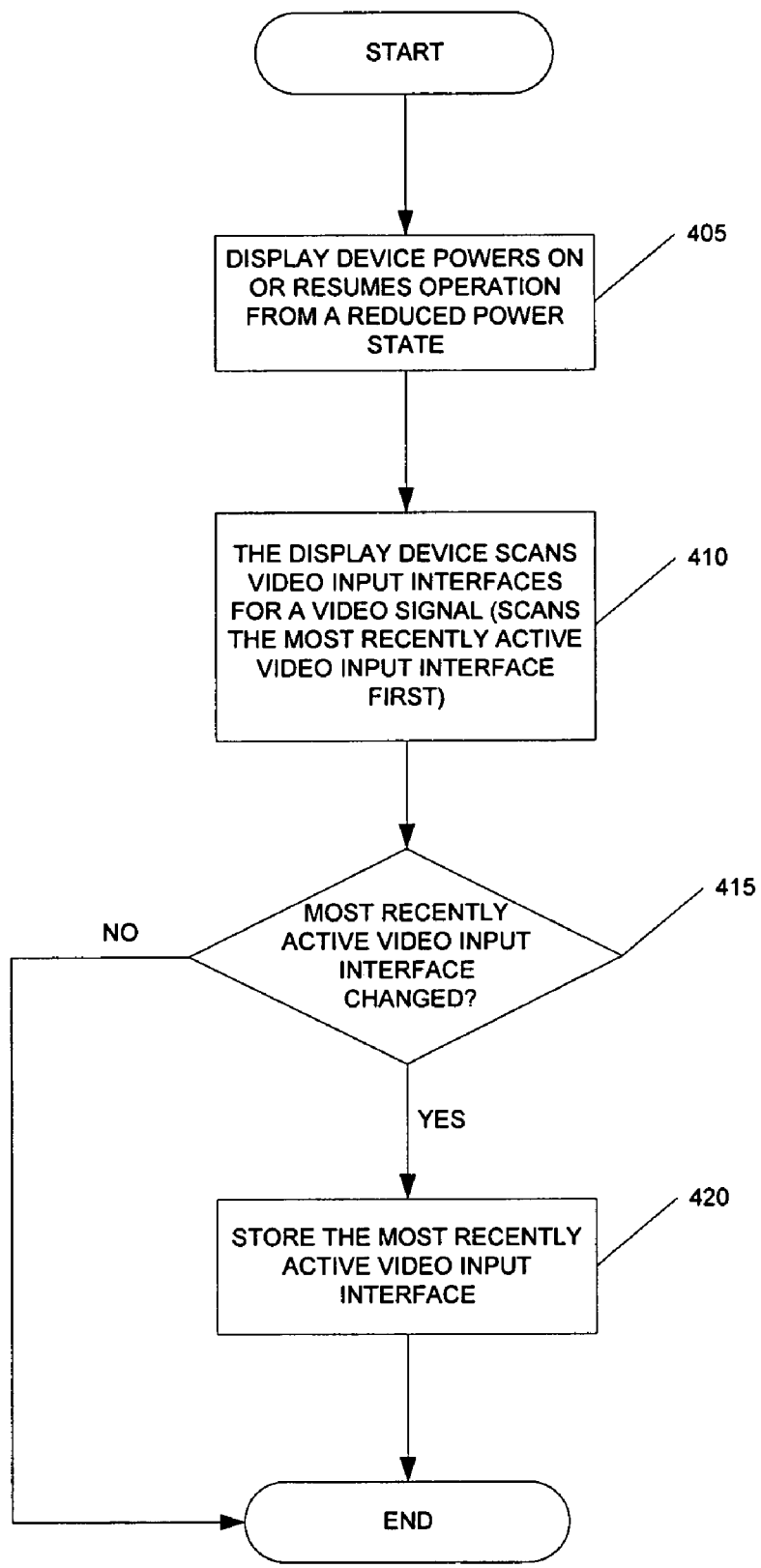
FIG. 4 is a flow chart of operations of an example of the process of FIG. 3.

FIG. 4 is flow chart of operations of a process that is a more specific example of the process of FIG. 3. In this example, the activity information discussed above includes information about the display device 200's most recently active video input interface. The operation begins at a step 405, where similar to the step 305 of FIG. 3, the display device powers on or resumes operation from a reduced power state. After the step 405, the operation continues to a step 410.

At the step 410, the display device 200 scans its video input interfaces for a video signal. In this example, the display device 200 scans by first scanning the most recently active video input interface. The display device 200 stores the most recently active video input interface (or its reference) in the storage device 230. After the step 410, the operation continues to a step 415.

At the step 415, the display device 200 determines whether the most recently active video input interface has changed. The display device 200 makes the determination if at the step 410, the display device 200 detects a video signal at a video input interface that is not the most recently active video input interface. If the display device 200 determines that the most recently active video input interface has changed, the operation continues to a step 420. Otherwise, the operation ends.

At the step 420, the display device 200 stores the video input interface that is now the most recently active video input interface. As discussed above, the display device 200 stores the most recently active video input interface or a reference thereto, in the storage device 230. After the step 420, the operation ends.

Although illustrative embodiments have been shown and described, a wide range of modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein

What is claimed is:

1. A method to display an image on a display device, the method comprising:

in response to activity information associated with one or more video input interfaces included in a plurality of video input interfaces, determining a sequence in which the plurality of video input interfaces are scanned for a video signal, wherein determining the sequence includes:

in response to determining that a video input interface is the most recently active video input interface, determining that the video input interface is the first video input interface to be scanned for a video signal; and displaying an image on the display device from the first video input interface to be scanned.

2. The method of claim 1, wherein the sequence is stored in a storage device of the display device.

3. The method of claim 2, wherein the storage device is a register.

4. The method of claim 1, wherein the activity information is stored in a storage device of the display device.

5. The method of claim 1, wherein the storage device is a register.

6. The method of claim 1, and comprising:

scanning the plurality of video input interfaces in the sequence.

7. The method of claim 6, wherein scanning the plurality of video input interfaces in the sequence includes:

scanning in response the display device powering on.

8. The method of claim 6, wherein scanning the plurality of video input interfaces in the sequence includes:

scanning in response to the display device resuming its operation from a reduced power state.

9. A display device comprising:

a plurality of video input interfaces; and a display controller, coupled to the plurality of video input interfaces, for:

in response to activity information associated with one or more video input interfaces included in the plurality of video input interfaces, determining a sequence in which the plurality of video input interfaces are scanned for a video signal, wherein determining the sequence includes:

in response to determining that a video input interface is the most recently active video input interface, determining that the video input interface is the first video input interface to be scanned for a video signal.

10. The device of claim 9, and comprising:

a storage device, coupled to the display controller, for storing the sequence.

11. The device of claim 10, wherein the storage device is a register.

12. The device of claim 9, and comprising:

a storage device, coupled to the display controller, for storing the activity information.

13. The device of claim 9, wherein the storage device is a register.

14. The device of claim 9, and comprising:

scanning the plurality of video input interfaces in the sequence.

15. The device of claim 14, wherein scanning the plurality of video input interfaces in the sequence includes:

scanning in response the display device powering on.

16. The device of claim 14, wherein scanning the plurality of video input interfaces in the sequence includes:

scanning in response to the display device resuming its operation from a reduced power state.

17. An information handling system ("IHS") comprising:

a processor; and a display device, coupled to the processor, and including a plurality of video input interfaces and a display controller coupled to the plurality of video input interfaces, wherein the display controller is for:

in response to activity information associated with one or more video input interfaces included in the plurality of video input interfaces, determining a sequence in which the plurality of video input interfaces are scanned for a video signal, wherein determining the sequence includes:

in response to determining that a video input interface is the most recently active video input interface, determining that the video input interface is the first video input interface to be scanned for a video signal.

* * * * *